US008100580B2

(12) United States Patent
Hannula et al.

(10) Patent No.: US 8,100,580 B2
(45) Date of Patent: Jan. 24, 2012

(54) MEASUREMENT OF STEAM QUALITY IN STEAM TURBINE

(75) Inventors: Scott Victor Hannula, Rexford, NY (US); Randy Scott Rosson, Simpsonville, SC (US); Kevin Wood Wilkes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 540 days.

(21) Appl. No.: 12/428,428

(22) Filed: Apr. 22, 2009

(65) Prior Publication Data

US 2010/0272147 A1 Oct. 28, 2010

(51) Int. Cl.
*G01N 25/22* (2006.01)
*F01K 13/00* (2006.01)
*F01K 17/04* (2006.01)
*G01M 15/10* (2006.01)

(52) U.S. Cl. ............ 374/42; 374/141; 374/147; 374/27; 73/25.04; 73/113.01; 73/112.03; 60/660

(58) Field of Classification Search .................... 374/16, 374/28, 27, 31, 32, 39, 36, 42, 45, 57, 4, 374/100, 141, 142, 143, 144, 145, 147, 208; 73/25.04, 25.01, 29.01, 37, 113.01, 114.71, 73/112.02, 112.03, 1.57, 19.01, 232; 60/203.1, 60/204, 227, 235, 238, 648, 659, 660, 686, 60/39.182, FOR. 118
See application file for complete search history.

(56) References Cited

U.S. PATENT DOCUMENTS 3,873,817 A * 3/1975 Liang ............................ 700/287
3,972,196 A 8/1976 Silvestri, Jr.
4,679,947 A * 7/1987 Miller et al. .................... 374/42
4,753,106 A 6/1988 Brenner et al.
4,769,593 A 9/1988 Reed et al.
4,788,848 A 12/1988 Hsueh
4,836,032 A 6/1989 Redus et al.
4,849,988 A 7/1989 Chien
4,876,897 A 10/1989 DeCarlo et al.
5,005,351 A * 4/1991 Archer ............................ 60/686
5,307,832 A 5/1994 Stoy et al.
6,146,088 A 11/2000 Martinez
6,286,314 B1 * 9/2001 Kitz ............................. 60/641.2
6,539,717 B2 * 4/2003 Kitz ............................. 60/641.2
7,021,126 B1 * 4/2006 Badami et al. ............. 73/112.03
7,034,302 B2 * 4/2006 Davidson et al. .......... 250/339.1
2006/0053872 A1 * 3/2006 Badami et al. .................. 73/112
2007/0214766 A1 * 9/2007 Obana et al. ................. 60/39.15
2008/0236616 A1 * 10/2008 Bloch ............................... 134/2

FOREIGN PATENT DOCUMENTS

DE 102008044477 A1 3/2009
JP 2005091010 A * 4/2005
WO 8803647 A1 5/1988

OTHER PUBLICATIONS

European Search Report and Written Opinion, EP10160408, Jul. 28, 2010.

* cited by examiner

*Primary Examiner* — Gail Verbitsky
(74) *Attorney, Agent, or Firm* — Hoffman Warnick LLC

(57) ABSTRACT

A solution for measuring steam quality in a steam turbine is disclosed. A steam quality measurement (SQM) device and an ejector are coupled to a steam turbine through an appropriate piping configuration to draw steam emitted from the turbine through the SQM device for measurement of the steam quality, for example, continuously, during operation of the turbine.

18 Claims, 2 Drawing Sheets

MEASUREMENT OF STEAM QUALITY IN STEAM TURBINE

BACKGROUND OF THE INVENTION

The invention relates generally to steam turbines. More particularly, the invention relates to a solution for measuring steam quality in a steam turbine.

Measurement of the steam quality in a steam turbine is often desired in order to improve the turbine's performance, improve turbine control and plant control (such as tuning condenser performance, heat recovery steam generator (HRSG) adjustments and gas turbine operation). However, current methods of measuring the quality of steam in a steam turbine do not provide a means for measuring steam quality during normal operation of the turbine. For example, one current method, a tracer test, such as described in U.S. Pat. No. 4,788,848, can be performed, which basically involves the injection of a solution into the steam supply. However, the feedback from a tracer test is not immediate and typically the high costs of running such a test prohibits it from being done on a constant basis.

Alternatively, the quality of the steam can be inferred, although often inaccurately, from measurement of other data, such as total plant heat balances. In other words, an analyst can attempt to infer what quality of steam must have been present to produce other measured results. Obviously, this means of measuring steam quality has inherent limitations and does not accurately measure the quality of steam in a system.

BRIEF DESCRIPTION OF THE INVENTION

A solution for measuring steam quality in a steam turbine is disclosed. A steam quality measurement (SQM) device and an ejector are coupled to a steam turbine through an appropriate piping configuration to draw steam emitted from the turbine through the SQM device for measurement of the steam quality during operation of the turbine.

A first aspect of the disclosure provides a system for measuring steam quality, the system comprising: an inlet for receiving a steam exhaust from a steam turbine; a steam quality measurement (SQM) device, a first end of the SQM device coupled to the steam turbine, the SQM device configured to measure steam quality; and an ejector, wherein one end of the ejector is coupled to a second end of the SQM device and one end of the ejector is coupled to a source of motive fluid at a higher pressure than the steam exhaust, the ejector configured to draw a portion of the steam exhaust through the SQM device.

A second aspect of the disclosure provides a method of measuring steam quality, the method comprising: receiving an exhaust of a steam turbine at a first end of a steam quality measurement (SQM) device, the SQM device configured to measure steam quality; drawing a portion of the steam exhaust through the SQM device by coupling an ejector to a second end of the SQM device and passing motive fluid at a higher pressure than the steam exhaust through the ejector to draw the portion of the steam exhaust through the SQM device; and measuring the steam quality of the portion of the steam exhaust as the portion passes through the SQM device.

A third aspect of the disclosure provides a steam turbine comprising: a turbine section having an exhaust, the exhaust configured to emit steam exhaust; a steam quality measurement (SQM) device, coupled to the exhaust at a first end of the SQM device, the SQM device configured to measure steam quality; and an ejector, wherein one end of the ejector is coupled to a second end of the SQM device and one end of the ejector is coupled to a source of motive fluid at a higher pressure than the steam exhaust, the ejector configured to draw a portion of the steam exhaust through the SQM device.

DETAILED DESCRIPTION OF THE INVENTION

Figure 1:
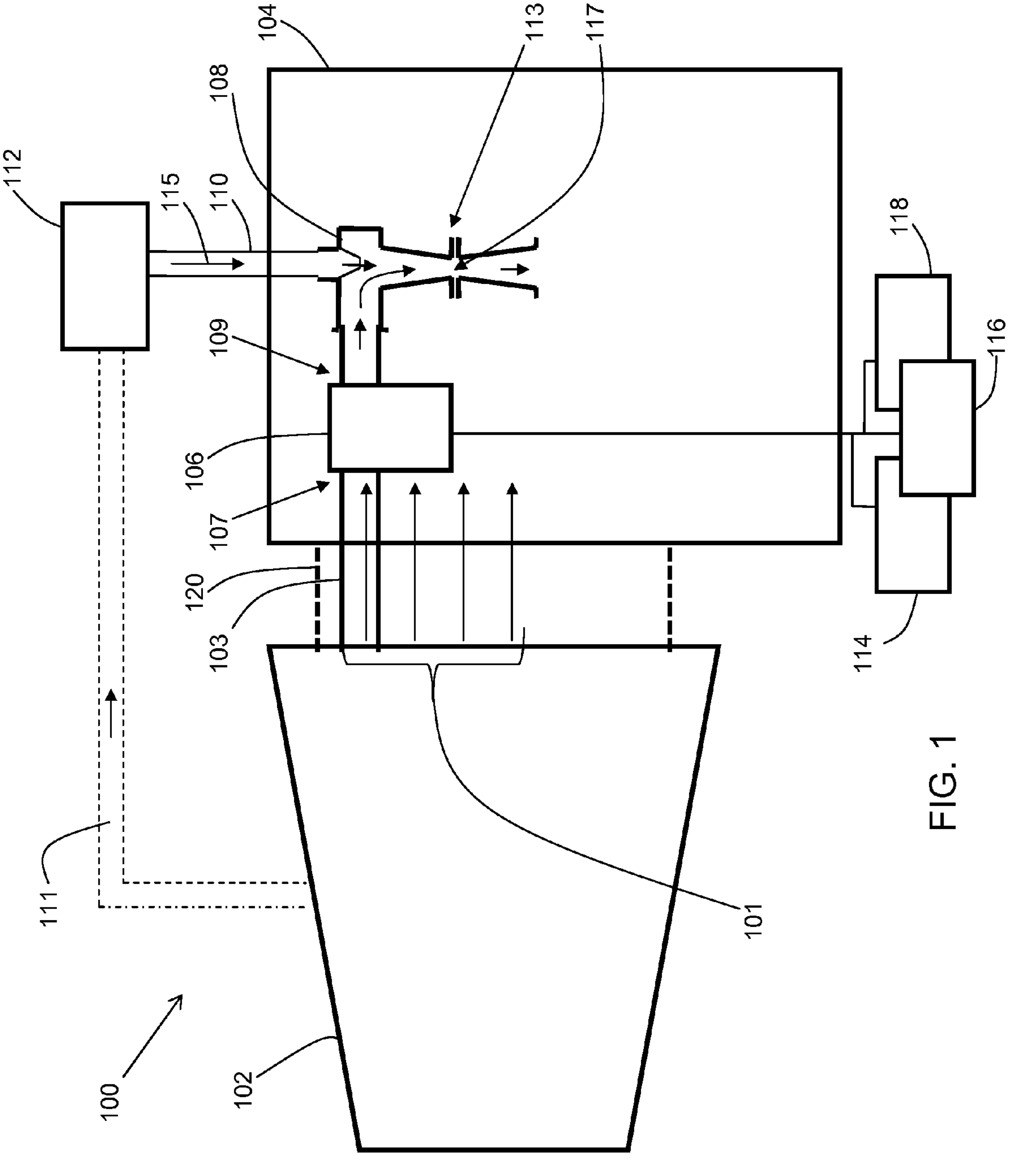
FIG. 1 shows a schematic of the system for measuring steam quality according to an embodiment of this invention.

Turning to FIG. 1, a system 100 for measuring steam quality in a steam turbine 102 according to an embodiment of this invention is shown. System 100 includes a steam quality measurement (SQM) device 106 configured to measure steam quality in steam turbine 102 during operation of steam turbine 102, for example, continuously. A first end 107 of SQM device 106 is coupled to steam turbine 102. As known in the art, steam turbine 102 will emit steam exhaust through an exhaust (not shown). Steam exhaust emitted from steam turbine 102 is illustrated by arrows 101. During operation, exhaust steam 101 will be emitted from steam turbine 102 into condenser 104 to be condensed and recycled for further use in steam turbine 102. Depending on the specific arrangement of steam turbine 102 and condenser 108, there may also be a transition piece 120 between steam turbine 102 and condenser 108. Transition piece 120 can be any shape or material desired, configured to direct steam exhaust 101 from steam turbine 102 into condenser 108.

As shown in FIG. 1, SQM device 106 is coupled to steam turbine 102 in order to allow at least some of exhaust steam 101 to flow through SQM device 106. It is understood that one of ordinary skill in the art could couple SQM device 106 and steam turbine 102 through an appropriate piping configuration 103 in any now known or later developed manner.

SQM device 106 can comprise any now known or later developed means for measuring steam quality. Examples of SQM devices 106 that can be used in connection with embodiments of this invention include those disclosed in the following patents: U.S. Pat. Nos. 4,769,593, 4,849,988, 4,753,106, 4,876,897 and 4,836,032.

Steam exhaust 101 emitted from steam turbine 102 is typically below atmospheric pressure, therefore, in order to draw at least some of steam exhaust 101 through SQM device 106, an ejector 108 is provided. Ejector 108 is coupled to SQM device 106 at a second end 109 of SQM device 106. Second end 109 of SQM device 106 is generally opposite first end 107 of SQM device 106 which is coupled to steam turbine 102. In other words, steam turbine 102, SQM device 106 and ejector 108 are arranged substantially in-line such that ejector 108 can draw steam exhaust 101 through SQM device 106 as discussed herein.

Ejector 108 operates as a typical injector/ejector as known in the art using the Venturi effect to draw fluid through a nozzle. For example, as shown in FIG. 1, ejector 108 can include a converging-diverging nozzle 113 used to convert pressure energy of a motive fluid 115 to velocity energy which creates a low pressure zone 117 within the converging-diverging nozzle 113 that draws in steam exhaust 101. Ejector 108 is coupled to a motive fluid source 112 to provide motive fluid 115 to ejector 108. The motive fluid source can provide motive fluid 115 in the form of air or steam that is at a higher pressure than steam exhaust 101, and can be provided via an appropriate piping configuration 110 to ejector 108. The motive fluid can also be steam exhaust from a point further upstream in steam turbine 102 (e.g., steam exhaust that has not yet exited steam turbine 102) as that steam exhaust would be at a higher pressure than steam exhaust 101 that has been emitted from steam turbine 102. The phantom lines 111 show an example of how that higher pressure steam can be routed to ejector 108 to be used as motive fluid. Depending on the requirements of SQM device 106 that is used, ejector 108 can be configured to draw a requisite amount of steam exhaust 101 through SQM device 106.

Ejector 108 draws a portion of steam exhaust 101 through SQM device 106 so that SQM device 106 can measure the quality of the portion of steam exhaust 101 being emitted from steam turbine 102 during operation of steam turbine 102. In one embodiment, SQM device 106 can continuously, i.e., without interruption, measure the quality of the portion of steam exhaust 101 during operation of steam turbine 102. In other embodiments, system 100 can be configured such that (1) the measurement of steam exhaust 101 is part of the operation of the system, (2) the measurement of steam exhaust 101 is automatically made and can be recorded at pre-determined time increments, (3) the measurement of steam exhaust 101 does not require a change in the operation of the system for the purpose of making the measurement, and/or (4) the time required to perform the measurement of steam exhaust 101 for one scan is very small relative to the operation of the system.

The results of the measurement from SQM device 106 can be outputted or displayed in any known means, including on an indicator 114, stored in a memory (database, files, etc.) of an electronic storage device 116 (such as a computer, flash drive, or other commonly known storage device) and/or used as a feedback item for a control system 118. Once the portion of steam exhaust 101 has passed through SQM device 106, the portion of steam exhaust 101 is emitted into condenser 104 to be condensed and recycled for further use in steam turbine 102.

Figure 2:
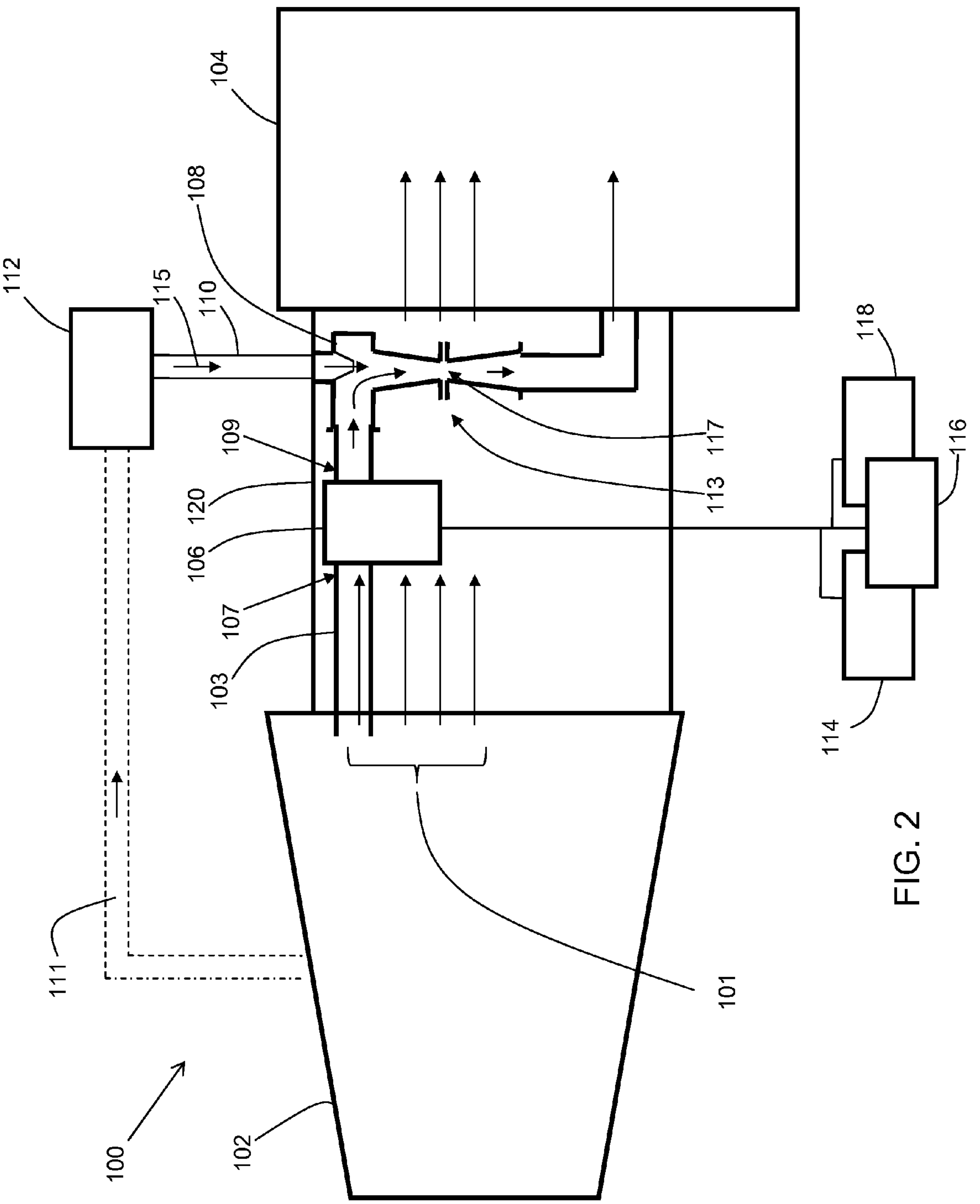
FIG. 2 shows a schematic of the system for measuring steam quality according to another embodiment of this invention.

While system 100 is discussed herein in connection with measuring steam quality as it exits the exhaust of turbine 102, it is understood that system 100 can also be used to measure the steam quality in any area of the turbine where moisture is present, such as feed water heaters, steam seal systems, and any other steam turbine admissions and extractions points. It is also noted that while FIG. 1 shows SQM device 106 and ejector 108 as being inside condenser 104, near the point at which steam exhaust 101 enters condenser 104, other configurations may be possible. For example, SQM device and ejector 108 may be located right at the point at which steam exhaust 101 enters condenser 104 or may be further away from that point. In another embodiment, one or both of SQM device 106 and ejector 108 can be outside condenser 104. For example, as shown in FIG. 2, SQM device 106 and ejector 108 are positioned in transition piece 120 between steam turbine 102 and condenser 104.

In another embodiment, a method of measuring steam quality using system 100 is disclosed. The method includes receiving steam exhaust 101 from steam turbine 102 at first end 107 of SQM device 106, drawing a portion of steam exhaust 101 through SQM device 106 by coupling ejector 108 to second end 109 of SQM device 106 and passing motive fluid 115 at a higher pressure than steam exhaust 101 through ejector 108 to draw the portion of steam exhaust 108 through SQM device 106, and measuring the steam quality of the portion of steam exhaust 101 as the portion passes through SQM device 106.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for measuring steam quality, the system comprising:
- an inlet for receiving a steam exhaust from a steam turbine;
- a steam quality measurement (SQM) device, a first end of the SQM device coupled to the inlet, the SQM device configured to measure steam quality; and
- an ejector, wherein one end of the ejector is coupled to a second end of the SQM device and one end of the ejector is coupled to a source of motive fluid at a higher pressure than the steam exhaust, the ejector configured to draw a portion of the steam exhaust through the SQM device.

2. The system of claim 1, wherein the SQM device measures the steam quality of the portion of the steam exhaust during operation of the steam turbine.

3. The system of claim 1, wherein the SQM device continuously measures the steam quality of the portion of the steam exhaust.

4. The system of claim 1, wherein the first end of the SQM device to which the inlet is coupled is opposite the second end of the SQM device to which the ejector is coupled.

5. The system of claim 1, wherein the SQM device outputs a result of the steam quality measurement to one or more of the following devices: an indicator configured to display the results, an electronic storage device configured to store the results, and a control system configured to receive the results as a feedback item.

6. The system of claim 1, further comprising a condenser for receiving the portion of the steam exhaust after the portion has passed through the SQM device.

7. A method of measuring steam quality, the method comprising:
- receiving a steam exhaust of a steam turbine at a first end of a steam quality measurement (SQM) device, the SQM device configured to measure steam quality;
- drawing a portion of the steam exhaust through the SQM device by coupling an ejector to a second end of the SQM device and passing motive fluid at a higher pressure than the steam exhaust through the ejector to draw the portion of the steam exhaust through the SQM device; and measuring the steam quality of the portion of the steam exhaust as the portion passes through the SQM device.

8. The method of claim 7, wherein the SQM device measures the steam quality of the portion of the steam exhaust during operation of the steam turbine.

9. The method of claim 7, wherein the SQM device continuously measures the steam quality of the portion of the steam exhaust.

10. The method of claim 7, wherein the first end of the SQM device which receives the steam exhaust is opposite the second end of the SQM device to which the ejector is coupled.

11. The method of claim 7, further comprising outputting a result of the steam quality measurement to one or more of the following devices: an indicator configured to display the results, an electronic storage device configured to store the results, and a control system configured to receive the results as a feedback item.

12. The method of claim 7, further comprising emitting the portion of the steam exhaust to a condenser after the portion of the steam exhaust has passed through the SQM device.

13. A steam turbine comprising:

a turbine section having an exhaust, the exhaust configured to emit steam exhaust;

a steam quality measurement (SQM) device, coupled to the exhaust at a first end of the SQM device, the SQM device configured to measure steam quality; and an ejector, wherein one end of the ejector is coupled to a second end of the SQM device and one end of the ejector is coupled to a source of motive fluid at a higher pressure than the steam exhaust, the ejector configured to draw a portion of the steam exhaust through the SQM device.

14. The steam turbine of claim 13, wherein the SQM device measures the steam quality of the portion of the steam exhaust during operation of the steam turbine.

15. The steam turbine of claim 13, wherein the SQM device continuously measures the steam quality of the portion of the steam exhaust.

16. The steam turbine of claim 13, wherein the first end of the SQM device to which the exhaust is coupled is opposite the second end of the SQM device to which the ejector is coupled.

17. The steam turbine of claim 13, wherein the SQM device outputs a result of the steam quality measurement to one or more of the following devices: an indicator configured to display the results, an electronic storage device configured to store the results, and a control system configured to receive the results as a feedback item.

18. The steam turbine of claim 13, further comprising a condenser for receiving the portion of the steam exhaust after the portion has passed through the SQM device.

* * * * *